(12) United States Patent
Kondapi et al.

(10) Patent No.: US 12,737,191 B2
(45) Date of Patent: Sep. 15, 2026

(54) SYSTEMS AND METHODS TO PRIORITIZE LOADING OF AGENT AND PLUGINS DURING SUBSEQUENT BOOT TIME OF INFORMATION HANDLING SYSTEM

(71) Applicant: Dell Products, L.P., Round Rock, TX (US)

(72) Inventors: Srikanth Kondapi, Austin, TX (US); Danilo O. Tan, Austin, TX (US); Ricardo Antonio Ruiz, The Colony, TX (US)

(73) Assignee: Dell Products L.P., Round Rock, TX (US)

( * ) Notice: Subject to any disclaimer, the term of this patent is extended or adjusted under 35 U.S.C. 154(b) by 80 days.

(21) Appl. No.: 18/472,480

(22) Filed: Sep. 22, 2023

(65) Prior Publication Data

US 2025/0103347 A1 Mar. 27, 2025

(51) Int. Cl.
*G06F 9/4401* (2018.01)

(52) U.S. Cl.
CPC .................................... *G06F 9/441* (2013.01)

(58) Field of Classification Search
CPC ....................................................... G06F 9/441
See application file for complete search history.

(56) References Cited

U.S. PATENT DOCUMENTS 6,598,159 B1 * 7/2003 McAlister ............. G06F 9/4416 709/222
8,543,665 B2 9/2013 Ansari et al.
10,127,080 B2 11/2018 Farhan et al.
10,740,078 B2 * 8/2020 Hoff .......................... G06F 8/61
11,150,911 B2 * 10/2021 Kondapi ............... G06F 9/4416
12,321,756 B2 * 6/2025 Ali ............................ G06F 8/61
2011/0113227 A1 * 5/2011 Lu ......................... G06F 9/4408 713/2
2016/0224382 A1 8/2016 Farhan et al.

* cited by examiner

*Primary Examiner* — Tammara R Peyton
(74) *Attorney, Agent, or Firm* — Fogarty LLP

(57) ABSTRACT

Systems and methods for prioritizing loading of agents and plugins during boot time of an IHS are described. In an illustrative, non-limiting embodiment, a first Information Handling System (IHS) may include: a processor; and a memory coupled to the processor, wherein the memory comprises program instructions store thereon that, upon execution by the processor, cause the IHS to: obtain behavior information of one or more users of the IHS regarding at least one application of the IHS; and launch an agent associated with the application during a boot of the IHS, or load a plugin associated with the application during the boot of the IHS, based, at least in part, on the behavior information.

20 Claims, 6 Drawing Sheets

SYSTEMS AND METHODS TO PRIORITIZE LOADING OF AGENT AND PLUGINS DURING SUBSEQUENT BOOT TIME OF INFORMATION HANDLING SYSTEM

FIELD

This disclosure relates generally to Information Handling Systems (IHSs), and more specifically, to systems and methods for prioritizing loading of agents and plugins during boot time of an IHS.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Systems and methods for prioritizing loading of agents and plugins during boot time of an IHS are described. In an illustrative, non-limiting embodiment, an Information Handling System (IHS) may include: a processor; and a memory coupled to the processor, where the memory includes program instructions store thereon that, upon execution by the processor, cause the IHS to: obtain behavior information of one or more users of the IHS regarding at least one application of the IHS; and launch an agent associated with the application during a boot of the IHS, or load a plugin associated with the application during the boot of the IHS, based, at least in part, on the behavior information.

In some embodiments, the behavior information includes information regarding a launching of a user interface associated with the at least one application by a user of the one or more users. In some embodiments, the behavior information includes information regarding an adding of the at least one application to a StartUp folder by a user of the one or more users. In some embodiments, the behavior information includes information regarding a plugging in of a peripheral associated with the application into the IHS by a user of the one or more users.

In some embodiments, to launch the agent associated with the application or load the plugin associated with the application, the program instructions, upon execution by the processor, further cause the IHS to: trigger start the agent associated with the application during the boot of the IHS based, at least in part, on the behavior information, where the agent was scheduled to either start with a delay or start on-demand. In some embodiments, to launch the agent associated with the application or load the plugin associated with the application, the program instructions, upon execution by the processor, further cause the IHS to: change a configuration of the plugin to load during boot based, at least in part, on the behavior information, where the plugin was configured to load either after a delay interval or on-demand.

In some embodiments, the behavior information includes information regarding a plurality of trigger starts of an agent associated with the at least one application, where the agent uses the plugin. In some embodiments, prior to launching the agent associated with the application, or loading the plugin associated with the application, the program instructions further cause the IHS to: execute a machine learning algorithm to determine to launch the agent during the boot of the IHS, or load the plugin during the boot of the IHS, where the determination of the machine learning algorithm is based, at least in part, on the behavior information of the one or more users.

In some embodiments, a unifying agent of the IHS is configured to: (i) obtain the behavior information; and (ii) launch the agent or load the plugin. In some embodiments, prior to launching the agent associated with the application, the program instructions further cause the IHS to: determine that the agent is associated with the application based, at least in part, on a database associating user interfaces to agents.

In another illustrative, non-limiting embodiment, a method includes: receiving a boot priority setting for at least one agent or plugin, where the boot priority setting is determined based, at least in part, upon post-boot behavior of a user of an Information Handling System (IHS); and launching the agent or loading the plugin according to the boot priority setting in a subsequent boot.

In some embodiments, the boot priority setting is selected from the group including: automatic, and delayed start. In some embodiments, the at least one agent or plugin is associated with a first application, where in response to the post-boot behavior indicating that the user manually launches a second application that uses the first application, the boot priority setting is automatic. In some embodiments, in response to the post-boot behavior indicating that the user manually launches an application associated with the agent or plugin upon boot, the boot priority setting is automatic. In some embodiments, prior to receiving the boot priority setting for the at least one agent or plugin, the method further includes: executing a machine learning algorithm to determine to launch the at least one agent during the boot of the IHS, or load the at least one plugin during the boot of the IHS, where the determination of the machine learning algorithm is based, at least in part, on behavior information of the user.

In another illustrative, non-limiting embodiment, one or more non-transitory computer-readable storage media store program instructions, that when executed on or across one or more processors of an Information Handling System (IHS), cause the IHS to: obtain behavior information of one or more users of the IHS regarding at least one application of the IHS; and launch an agent associated with the application during a boot of the IHS, or load a plugin associated with the application during the boot of the IHS, based, at least in part, on the behavior information.

In some embodiments, the behavior information includes at least one of: information regarding a launching of a user interface associated with the at least one application by a user of the one or more users; information regarding an adding of the at least one application to a StartUp folder by a user of the one or more users; or information regarding a plugging in of a peripheral associated with the application into the IHS by a user of the one or more users.

In some embodiments, to launch the agent associated with the application or to load the plugin associated with the application, the program instructions further cause the IHS to: trigger start the agent associated with the application during the boot of the IHS based, at least in part, on the behavior information, where the agent was scheduled to either start with a delay or start on-demand. In some embodiments, to launch the agent associated with the application or to load the plugin associated with the application, the program instructions further cause the IHS to: change a configuration of the plugin to load during boot based, at least in part, on the behavior information, where the plugin was configured to load either after a delay interval or on-demand.

In some embodiments, prior to launching the agent associated with the application, or loading the plugin associated with the application, the program instructions further cause the IHS to: execute a machine learning algorithm to determine to launch the agent during the boot of the IHS, or load the plugin during the boot of the IHS, where the determination of the machine learning algorithm is based, at least in part, on the behavior information of the one or more users.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
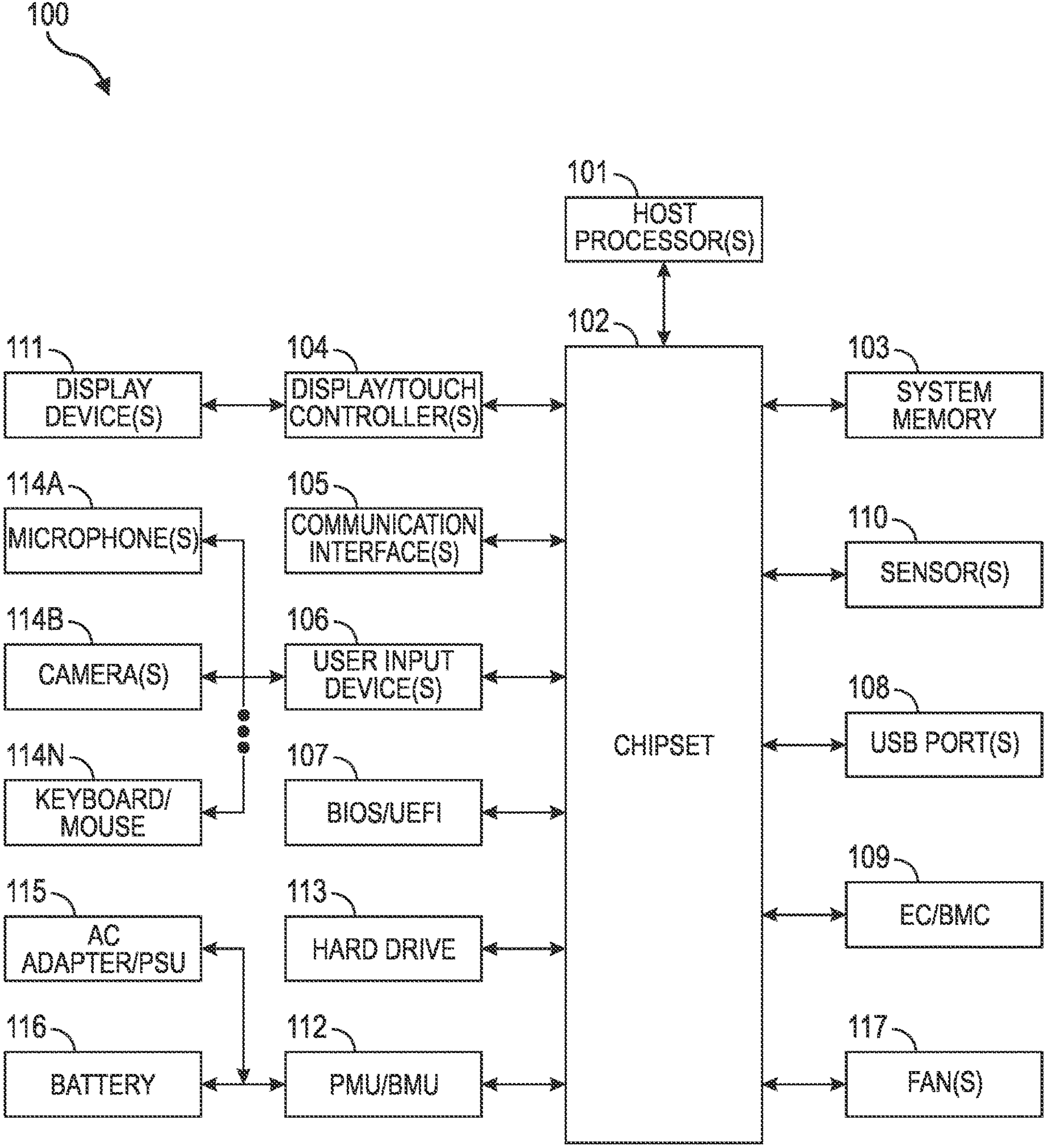
FIG. 1 is a diagram illustrating examples of hardware components of an Information Handling System (IHS), according to some embodiments.

FIG. 1 is a block diagram of hardware components of IHS 100, which may be used to implement prioritizing loading of agents and plugins during boot time of an IHS.

As depicted, IHS 100 includes host processor(s) 101. In various embodiments, IHS 100 may be a single-processor system, or a multi-processor system including two or more processors. Host processor(s) 101 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.).

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101.

Chipset 102 may also be coupled to communication interface(s) 105 to enable communications between IHS 100 and various wired and/or wireless networks, such as Ethernet, Wi-Fi, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like. Communication interface(s) 105 may also be used to communicate with certain peripherals devices (e.g., BT speakers, microphones, headsets, etc.). Moreover, communication interface(s) 105 may be coupled to chipset 102 via a Peripheral Component Interconnect Express (PCIe) bus, or the like.

Chipset 102 may be coupled to display/touch controller(s) 104, which may include one or more or Graphics Processor Units (GPUs) on a graphics bus, such as an Accelerated Graphics Port (AGP) or PCIe bus. As shown, display/touch controller(s) 104 provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc.

In some cases, display device(s) 111 may be provided as a single continuous display, or as two or more discrete displays.

Chipset 102 may provide host processor(s) 101 and/or display/touch controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like.

Chipset 102 may also provide host processor(s) 101 with access to one or more Universal Serial Bus (USB) ports 108, to which one or more peripheral devices may be coupled (e.g., integrated or external webcams, microphones, speakers, etc.).

Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc.

Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.)

In certain embodiments, chipset 102 may further provide an interface for communications with hardware sensors 110.

Sensors 110 may be disposed on or within the chassis of IHS 100, or otherwise coupled to IHS 100, and may include, but are not limited to: electric, magnetic, radio, optical (e.g., camera, webcam, etc.), infrared, thermal (e.g., thermistors etc.), force, pressure, acoustic (e.g., microphone), ultrasonic, proximity, position, deformation, bending, direction, movement, velocity, rotation, gyroscope, Inertial Measurement Unit (IMU), and/or acceleration sensor(s).

Upon booting of IHS 100, host processor(s) 101 may utilize program instructions of Basic Input/Output System (BIOS) 107 to initialize and test hardware components coupled to IHS 100 and to load host OS 400 (FIG. 4) for use by IHS 100. BIOS 107 provides an abstraction layer that allows host OS 400 to interface with certain IHS components 100. Relying upon the hardware abstraction layer provided by BIOS 107, software stored in system memory 103 and executed by host processor(s) 101 can interface with certain I/O devices that are coupled to IHS 100.

The Unified Extensible Firmware Interface (UEFI) was designed as a successor to BIOS. As a result, many modern IHSs utilize UEFI in addition to or instead of a BIOS. As used herein, BIOS 107 is intended to also encompass a UEFI component.

Embedded Controller (EC) or Baseboard Management Controller (BMC) 109 is operational from the very start of each IHS power reset and handles various tasks not ordinarily handled by host processor(s) 101. Examples of these operations may include, but are not limited to: receiving and processing signals from a keyboard or touchpad, as well as other buttons and switches (e.g., power button, laptop lid switch, etc.), receiving and processing thermal measurements (e.g., performing fan control, CPU and GPU throttling, and emergency shutdown), controlling indicator LEDs (e.g., caps lock, scroll lock, num lock, battery, ac, power, wireless LAN, sleep, etc.), managing PMU/BMU 112, alternating current (AC) adapter/Power Supply Unit (PSU) 115 and/or battery 116, allowing remote diagnostics and remediation over network(s) 103, etc.

For example, EC/BMC 109 may implement operations for interfacing with power adapter/PSU 115 in managing power for IHS 100. Such operations may be performed to determine the power status of IHS 100, such as whether IHS 100 is operating from AC adapter/PSU 115 and/or battery 116.

Firmware instructions utilized by EC/BMC 109 may also be used to provide various core operations of IHS 100, such as power management and management of certain modes of IHS 100 (e.g., turbo modes, maximum operating clock frequencies of certain components, etc.).

In addition, EC/BMC 109 may implement operations for detecting certain changes to the physical configuration or posture of IHS 100. For instance, when IHS 100 as a 2-in-1 laptop/tablet form factor, EC/BMC 109 may receive inputs from a lid position or hinge angle sensor 110, and it may use those inputs to determine: whether the two sides of IHS 100 have been latched together to a closed position or a tablet position, the magnitude of a hinge or lid angle, etc. In response to these changes, the EC may enable or disable certain features of IHS 100 (e.g., front or rear facing camera, etc.).

In some cases, EC/BMC 109 may be configured to identify any number of IHS postures, including, but not limited to: laptop, stand, tablet, tent, or book. For example, when display(s) 111 of IHS 100 is open with respect to a horizontal keyboard portion, and the keyboard is facing up, EC/BMC 109 may determine IHS 100 to be in a laptop posture. When display(s) 111 of IHS 100 is open with respect to the horizontal keyboard portion, but the keyboard is facing down (e.g., its keys are against the top surface of a table), EC/BMC 109 may determine IHS 100 to be in a stand posture.

When the back of display(s) 111 is closed against the back of the keyboard portion, EC/BMC 109 may determine IHS 100 to be in a tablet posture. When IHS 100 has two display(s) 111 open side-by-side, EC/BMC 109 may determine IHS 100 to be in a book posture. When IHS 100 has two displays open to form a triangular structure sitting on a horizontal surface, such that a hinge between the displays is at the top vertex of the triangle, EC/BMC 109 may determine IHS 100 to be in a tent posture. In some implementations, EC/BMC 109 may also determine if display(s) 111 of IHS 100 are in a landscape or portrait orientation.

In some cases, EC/BMC 109 may be installed as a Trusted Execution Environment (TEE) component to the motherboard of IHS 100.

Additionally, or alternatively, EC/BMC 109 may be configured to calculate hashes or signatures that uniquely identify individual components of IHS 100. In such scenarios, EC/BMC 109 may calculate a hash value based on the configuration of a hardware and/or software component coupled to IHS 100. For instance, EC/BMC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC/BMC 109 may later recalculate the hash value for a component may compare it against the reference hash value to determine if any modifications have been made to the component, thus indicating that the component has been compromised. In this manner, EC/BMC 109 may validate the integrity of hardware and software components installed in IHS 100.

In various embodiments, IHS 100 may be coupled to an external power source (e.g., AC outlet or mains) through AC adapter/PSU 115. AC adapter/PSU 115 may include an adapter portion having a central unit (e.g., a power brick, wall charger, or the like) configured to draw power from an AC outlet via a first electrical cord, convert the AC power to direct current (DC) power, and provide DC power to IHS 100 via a second electrical cord.

Additionally, or alternatively, AC adapter/PSU 115 may include an internal or external power supply portion (e.g., a switching power supply, etc.) connected to the second electrical cord and configured to convert AC to DC. AC adapter/PSU 115 may also supply a standby voltage, so that most of IHS 100 can be powered off after preparing for hibernation or shutdown, and powered back on by an event (e.g., remotely via wake-on-LAN, etc.). In general, AC adapter/PSU 115 may have any specific power rating, measured in volts or watts, and any suitable connectors.

IHS 100 may also include internal or external battery 116. Battery 116 may include, for example, a Lithium-ion or Li-ion rechargeable device capable of storing energy sufficient to power IHS 100 for an amount of time, depending upon the IHS's workloads, environmental conditions, etc. In some cases, a battery pack may also contain temperature sensors, voltage regulator circuits, voltage taps, and/or charge-state monitors.

Power Management Unit (PMU) 112 governs power functions of IHS 100, including AC adapter/PSU 115 and battery 116. For example, PMU 112 may be configured to: monitor power connections and battery charges, charge battery 116, control power to other components, devices, or ICs, shut down components when they are left idle, control sleep and power functions ("on" and "off"), manage interfaces for built-in keypad and touchpads, regulate real-time clocks (RTCs), etc.

In some implementations, PMU 112 may include one or more Power Management Integrated Circuits (PMICs) configured to control the flow and direction or electrical power in IHS 100. Particularly, a PMIC may be configured to perform battery management, power source selection, voltage regulation, voltage supervision, undervoltage protection, power sequencing, and/or charging operations. It may also include a DC-to-DC converter to allow dynamic voltage scaling, or the like.

Additionally, or alternatively, PMU 112 may include a Battery Management Unit (BMU) (referred to collectively as "PMU/BMU 112"). AC adapter/PSU 115 may be removably coupled to a battery charge controller within PMU/BMU 112 to provide IHS 100 with a source of DC power from battery cells within battery 116 (e.g., a lithium ion (Li-ion) or nickel metal hydride (NiMH) battery pack including one or more rechargeable batteries). PMU/BMU 112 may include non-volatile memory and it may be configured to collect and store battery status, charging, and discharging information, and to provide that information to other IHS components.

Examples of information collected and stored in a memory within PMU/BMU 112 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), and BMU events.

Examples of BMU events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, power draw measurements may be conducted with control and monitoring of power supply via PMU/BMU 112. Power draw data may also be monitored with respect to individual components or devices of IHS 100. Whenever applicable, PMU/BMU 112 may administer the execution of a power policy, or the like.

IHS 100 may also include one or more fans 117 configured to cool down one or more components or devices of IHS 100 disposed inside a chassis, case, or housing. Fan(s) 117 may include any fan inside, or attached to, IHS 100 and used for active cooling. Fan(s) 117 may be used to draw cooler air into the case from the outside, expel warm air from inside, and/or move air across a heat sink to cool a particular IHS component. In various embodiments, both axial and sometimes centrifugal (blower/squirrel-cage) fans may be used.

In other embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components, such that all or a portion of the operations executed by the illustrated components may instead be executed by the integrated component.

For example, in various embodiments described herein, host processor(s) 101 and/or other components of IHS 100 (e.g., chipset 102, display/touch controller(s) 104, communication interface(s) 105, EC/BMC 109, etc.) may be replaced by discrete devices within a heterogenous computing platform (e.g., a System-On-Chip or "SoC"). As such, IHS 100 may assume different form factors including, but not limited to: servers, workstations, desktops, laptops, appliances, video game consoles, tablets, smartphones, etc.

Figure 2:
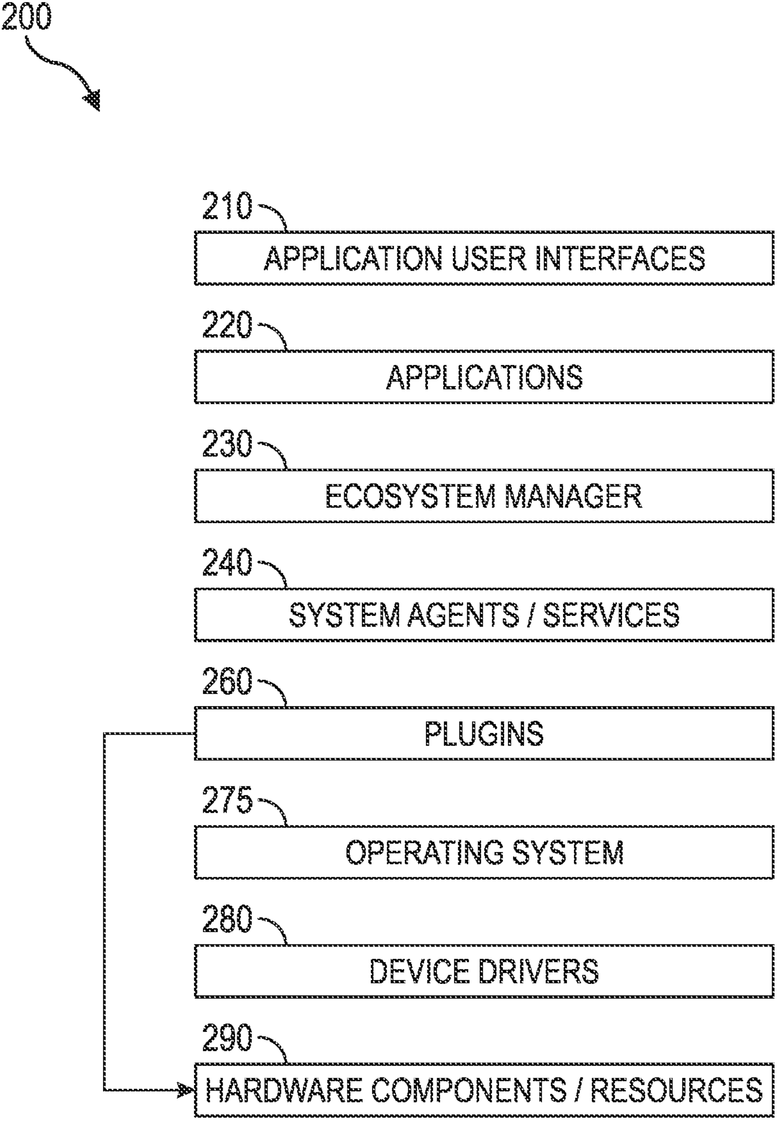
FIG. 2 is a block diagram depicting the software and hardware architectures of a system for prioritizing loading of agents and plugins during boot time of an IHS including a layered architecture, according to some embodiments.

FIG. 2 is a block diagram depicting the software and hardware architectures of a system for prioritizing loading of agents/services 240 and plugins 260 during boot time of an IHS, including a layered architecture 200, according to some embodiments. Such a layered architecture 200 can enable the encapsulation of similar functionality, the minimization of dependencies between functions in different layers, and enable facilitates reuse or sharing of logic across the layers (210, 220, 240, 260, 275, 280, 290) to provide an ecosystem manager 230, according to some embodiments.

As shown in FIG. 2, the IHS 100 can include a layered architecture 200 enabling the encapsulation of similar functionality; minimization of dependencies between functions in different layers; and, facilitates reuse or sharing of logic across the layers as provided by an ecosystem manager 230. The service management functionality provided by the ecosystem manager 230 can enable deployment of new services as pluggable modules 260 including computer readable instructions, data structures, program modules, objects, and other configuration data, in a plug and play fashion in some embodiments. The layered service architecture 200 additionally can provide the IHS with intra-process communication and inter-process communication amongst the many agents/services and modules in the agent/service framework layer 240 that enables the provisioning, management and execution of many applications and services 220, and their associated application user interfaces 210. The application user interfaces 210 enable communications from user endpoint devices with applications and/or service environments. FIG. 2 thus depicts a high-level service framework upon which are built services.

The base support layer of FIG. 2 includes essential hardware components or resources 290 including a processor device, e.g., a system on chip central processing unit ("CPU") that includes processing elements, digital signal processor resources and memory. The CPU is also coupled to a random access memory ("RAM) and additionally, non-volatile hard drive/disk magnetic and/or optical disk memory storage. Generally, the above-identified computer readable media provide non-volatile storage of computer readable instructions, data structures, program modules, objects, and other data for use by the IHS. The non-volatile hard drive/disk magnetic and/or optical disk memory storage can be partitioned into a network side which is the repository for storing all of the service logic and data associated with executing services subscribed to by the user, and, is invisible to the user, and, a user partition for storing user generated content and applications in which the user has visibility. Although not shown, the CPU may be coupled to a microcontroller for controlling a display device. Additional hardware components can include one or more Ethernet LAN/WAN interface cards (e.g., 802.11, T1, T3, 56 kb, X.25, DSL or xDSL) which may include broadband connections (e.g., ISDN. Frame Relay, ATM, Gigabit Ethernet, Ethernet over SONET, etc.), wireless connections, or some combination of any or all of the above, one or more USB interfaces and, the PCMCIA EvDO interface card. A data encryption/decryption unit can be additionally provided as part of the architecture for providing data security features. A watchdog timer element or like timer reset element can be provided as can be one or more LED devices for indicating status and other usable information to users of the IHS.

As further shown in FIG. 2, the device drivers layer 280 can includes all of the device drivers for the various interfaces including a device driver for the USB interface, PCMCIA and Ethernet interface cards, an LED controller and an integrated device electronics ("IDE") controller for the hard disk drive device provided. Additionally, as shown as part of the hardware and device driver components can be a Wi-Fi LAN access point and corresponding 802.11 wireless device driver. The device driver layer 280 can include a multitude of driver interfaces including but not limited to: a PCMCIA driver, for enabling low level communication between the IHS and the PCMCIA network interface card wireless interface, an IDE driver for enabling low level communication between the IHS and the local mass memory storage element, an Ethernet driver for enabling low level communication between the IHS and the Ethernet network interface card, an LED driver/controller, a USB driver, and a wireless network driver.

The device drivers 280 can provide the connectivity between the low-level hardware devices and the operating system 275 which can control the execution of computer programs and can provide scheduling, input-output control, file and data management, memory management, and communication control and related services for the IHS. With respect to the operating system 275, the IHS may include a computing device supporting any embedded operating system, any real-time operating system, any open-source operating system, any proprietary operating system, or even any operating systems for mobile computing devices as long as the operational needs of the client can be met. Exemplary operating systems that may be employed include Windows, Macintosh, Linux or UNIX or even an embedded Linux operating system. For instance, the IHS may be advantageously provided with an embedded operating system that provides operating system functions such as multiple threads, first-in first-out or round robin scheduling, semaphores, mutexes, condition variables, message queues, etc.

Before discussing the plugins layer 260, it is helpful to first discuss the system agents/services layer 240. Built upon the system operating system 275 is a system agents/services support layer 240 providing both client-like and server-like functions that enable a wide range of functionality for the types of services capable of being managed by the IHS. For instance, there can be provided a Dynamic Host Configuration Protocol (DHCP) client and server software modules. The DHCP client can particularly requests via a UDP/IP (User Datagram Protocol/Internet Protocol (e.g., Ipv4, Ipv6, etc.) configured connection information such as the IP address that the IHS has been dynamically assigned by a DHCP service, and/or any the subnet mask information, the IHS should be using. The DHCP server can dynamically assigns or allocates network IP addresses to subordinate client endpoints on a leased, (i.e., timed basis).

A Virtual Private Network (VPN) client may be included as part of the system agents/services support layer 240 to communicate via a proxy server in the service control network according to a VPN protocol or some other tunneling or encapsulation protocol. An SMPT client may be included for handling incoming/outgoing email over TCP in accordance with the Simple Mail Transfer protocol. A Network Time Protocol (NTP) (RFC 1305) can be included for generating and correlating timestamps for network events and providing generally time synchronization and distribution for the Internet. A Domain Name Server (DNS) client and server combination can be included for use by the IP stack to resolve fully-qualified host or symbolic names, i.e., mapping host names to IP addresses. An HTTP(S) server can be included for handling secure Hypertext Transfer Protocol (HTTP) (Secure Sockets Layer) communications for providing a set of rules for exchanges between a browser client and a server over TCP. It can provide for the transfer of information such as hypertext and hypermedia, and for the recognition of file types. HTTP can provide stateless transactions between the client and server. A Secure File Transfer Protocol (SFTP) client and server combination can be included which can govern the ability for file transfer over TCP. A SAMBA server can be included which can be an open source program providing Common Internet Files Services (CIFS) including, but not limited to file and print services, authentication and authorization, name resolution, and service announcement (browsing). An EvDO/PPP driver including a Point-to-Point Protocol (PPP) daemon can be included.

A PPPOE (Point-to-Point Protocol over Ethernet) client can be included which can combine the Point-to-Point Protocol (PPP), commonly used in dialup connections, with the Ethernet protocol, and which can support and provide authentication and management of multiple broadband subscribers in a local area network without any special support required from either the telephone company or an Internet service provider (ISP). The IHS can thus be adapted for connecting multiple computer users on an Ethernet local area network to a remote site through a gateway and can be used to enable users of an office or home to share a common Digital Subscriber Line (DSL), cable modem, or wireless connection to the Internet. A Secure Shell or SSH server can be implemented with HTTP protocol that can provide network protocol functionality adapted for establishing a secure channel between a local and a remote computer and encrypt traffic between secure devices by using public-key cryptography to authenticate the remote computer, and can potentially allow the remote computer to authenticate the user.

Additionally provided as part of the system agent/services layer 240 can be intelligent routing capability provided by an intelligent router device that can provide Quality of Service (QOS, e.g., guaranteed bandwidth) intelligent routing services, for example, by enforcing routing protocol rules and supporting unlimited multiple input sources and unlimited multiple destinations and, particularly, for routing communications to networked digital endpoint devices subordinate to the IHS. A central database server can also be included for handling all of the database aspects of the system, particularly, for maintaining and updating registries and status of connected digital endpoint devices, maintaining and updating service configuration data, services specific data (e.g., indexes of backed-up files, other service specific indexes, metadata related to media services, etc.) and firmware configurations for the devices, and for storing billing and transaction detail records, performance diagnostics, and all other database storage needs.

The system agents or services of the system agents/services layer 240 can configure hardware resources 290 according to a workload policy via a respective plug-in of the plugins layer 260. Configuration of hardware resources 290 may be implemented in various ways by plug-ins 260. For example, plug-ins 260 may directly access BIOS NV RAM to change a setting used by BIOS firmware. Plug-ins 260 may access or communicate with EC 109 to change a hardware setting. Plug-ins 260 may further access, or may include, hardware drivers, such as operating system drivers for individual ones of hardware resources 290.

Plug-ins 260 may represent modular code that is installed in a particular agent for accessing particular hardware resources 290. Accordingly, each plug-in 260 may be specific to a particular hardware resource 290 as well as being specific to a specific agent or service. Each one of plug-ins 260 may include monitoring and configuration functionality that may be implemented separately or may be combined. As hardware resources 290 are added, removed, updated, replaced, etc., a corresponding plug-in 260 may be added, removed, updated, replaced, etc.

For example, a CPU plug-in may provide monitoring and configuration support for a CPU, which may represent a processor or a processor subsystem; a memory plug-in may provide monitoring and configuration support for memory, which may represent a main memory accessible to CPU; a graphics plug-in may provide monitoring and configuration support for graphics, which may represent a graphics interface or a graphics processing unit; a storage plug-in may provide monitoring and configuration support for storage, which may represent a local or a remote storage resource; a cooling plug-in may provide monitoring and configuration support for cooling, which may represent a thermal control system; a display plug-in may provide monitoring and configuration support for display, which may represent one or more display devices, for example, coupled to graphics, and network plug-in may provide monitoring and configuration support for a network, which may represent any one or more network interfaces. It is noted that plug-ins 260 and hardware resources 290 described are exemplary and may include other elements in various embodiments.

Built on top of the system agents/services layer 240 can be an ecosystem manager layer 230 providing a software framework for operating system and communications level platform functionality such as for example CPU management; timer management; memory management functions; a firewall; a web wall for providing seamless WWW access over visual displays via access technologies enumerated herein, e.g., HTTP, SMS (Short Messaging Service) and WAP (Wireless Access Protocol); QoS management features, Bandwidth management features, and/or hard disk drive management features. It is noted that these features described are exemplary and an ecosystem manager 230 may include some, all, or none of these elements, as well as other elements in various embodiments.

The ecosystem manager layer 110 can also include a platform manager module which can implement unique rules based notification services on operational failure, i.e., when one of the component or services fails, the platform manager can detect this failure and take appropriate action such as implement a sequence of rules. The ecosystem manager layer 110 can also include a scheduler module for managing scheduled device maintenance, managing scheduled services, e.g., back-up services, etc.; a diagnostics module. The ecosystem manager layer 110 can also include firmware upgrades management module for managing firmware upgrades. The ecosystem manager layer 110 can also include a resource management module for managing system resources and digital contention amongst the various resources, e.g., CPU/Bandwidth utilization, etc. The ecosystem manager layer 110 can also include a display management module and a logger management module for storing and tracking IHS log in activity of users and applications, e.g., voice call logs. The ecosystem manager layer in concert with resource and service management components can enforce the separation of network side managed service control and user side delegations depending upon service subscriptions and configurations. For example, the platform and resource management can encompass rules and guidelines provided according to subscribed services that act to enforce, manage and control input/output operations, and use of hard drives space etc.

Referring back to FIG. 2, the applications layer 220 is built on top of the ecosystem manager 230. The applications layer 220 can provide user applications and services and application support threads including, but not limited to: file sharing functionality; backup services functionality; home storage functionality; network device management functionality; photo editing functionality; home automation functionality; media services functionality; call processing functionality; voice mail and interactive voice response functionality; presence and networking functionality; parental control functionality; and intelligent ads management functionality. The IHS further provides application service interfaces 210 that are used to enable a variety of user applications and communications modalities.

Figure 3:
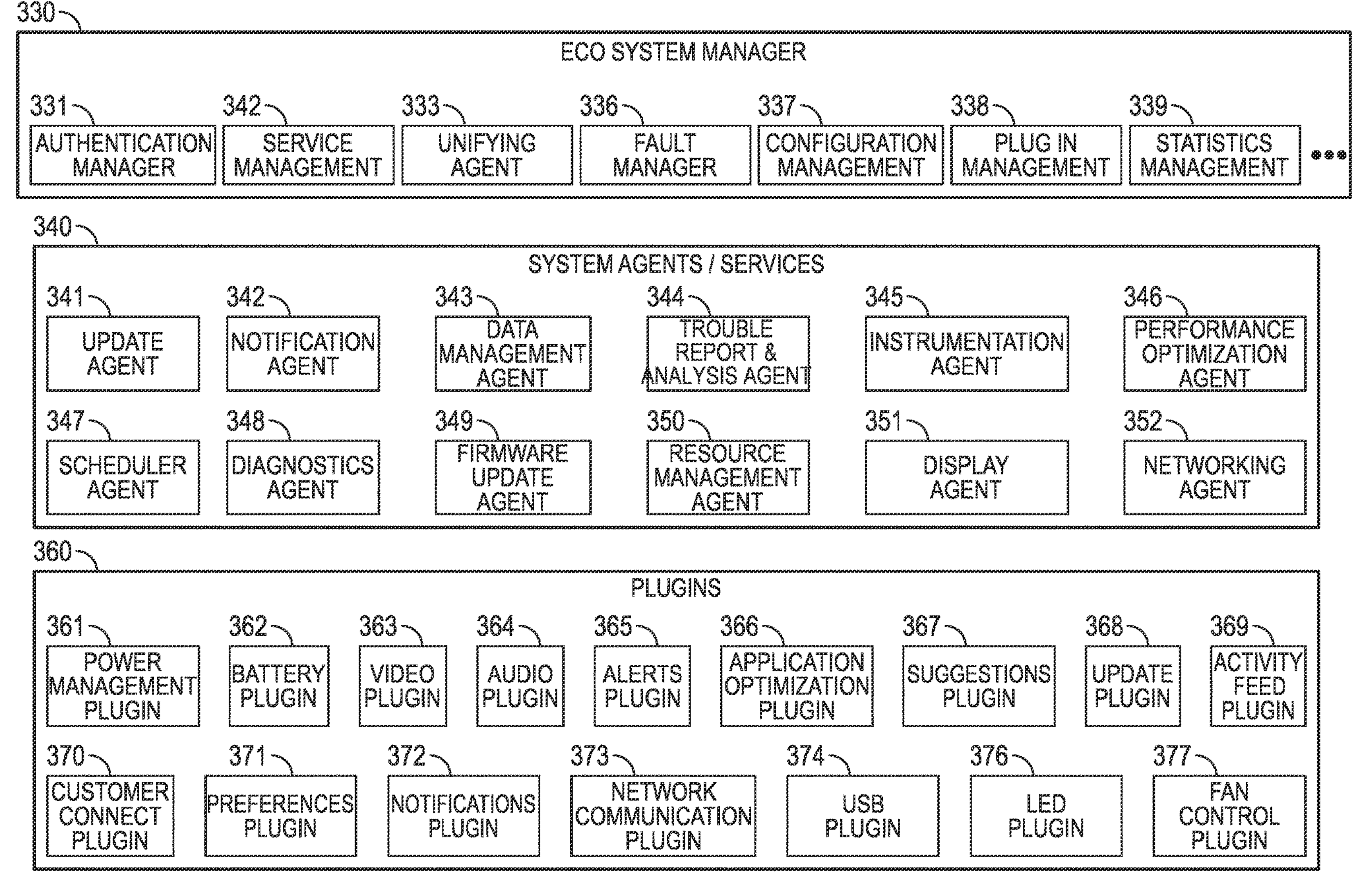
FIG. 3 is a block diagram depicting further details of the software and hardware architectures of a system for prioritizing loading of agents and plugins during boot time of an IHS, including details of the ecosystem manager, system agents and/or services, and plugins, according to some embodiments.

FIG. 3 is a block diagram depicting further details of the software and hardware architectures of a system for prioritizing loading of agents and plugins during boot time of an IHS, including details of the ecosystem manager 330, system agents and/or services 330, and plugins 360, according to some embodiments.

The ecosystem manager 330 can provide a software framework for operating system and communications level platform functionality, and can provide a library of application support service processes that facilitate data collection and data distribution, including, but not limited to the following. An authentication manager 331 can be used in authenticating devices connected to the IHS. A fault manager 336 can be used for detecting and managing determined system and/or service faults that are monitored and used for performance monitoring and diagnostics. Configuration management 337 can be used for tracking and maintaining device configuration. Service management 342 can be used for managing service configuration and firmware versions for subscribed services provided at the IHS. Statistics management 339 can be used for collecting and formatting features associated with the IHS. Statistics may relate to use of one or more services and associated time-stamped events that are tracked. Plug-in management 338 can be used for managing the plugins of the plugin layer 360. The unifying agent 333 can be lightweight in processing requirements. Its scope can be ecosystem infrastructure (e.g., agent lifecycle management, inter-agent communication framework etc.), and may not contain any system/business logic. The unifying agent 333 will be explained in further detail below.

The system agents and/or services 330 can provide both client-like and server-like functions that enable a wide range of functionality for the types of services capable of being managed by the IHS. These agents and/or services can include an update agent 341 that provides updates for system software, and can simplify the BIOS, firmware, driver, and application update experience for client hardware. A notification agent 342 can implement unique rules-based notification services on operational failure, such as sending notifications to the user or an IT service provider when failures occur at the IHS. In addition, the notification agent 342 can provide notifications for the firmware or software updates for the IHS. A data management agent 343 can provide software-defined data protection, automated discovery, deduplication, self-service and IT governance for physical, virtual and multi-cloud environments. The data management agent 343 can enable the protection, management and recovery of data in on-premises, virtualized and cloud deployments, including protection of in-cloud workloads, in some embodiments. It can also protect cloud-native workloads across multiple public clouds, in some embodiments.

A trouble report & analysis agent 344 can implement analysis of failures and take appropriate action, such as reporting. For example, when one of the components or services fails, the trouble report & analysis agent 344 can detect this failure and take appropriate action such as implement a sequence of rules. The instrumentation agent 345 can provide automated configuration and management of various components of the IHS including power, battery, video and audio devices. The performance optimization agent 346 can provide IHS optimization (e.g., AI-based optimization) designed to automatically improve application and device performance, PC and accessory battery run-time, audio/video settings and privacy in the background. The performance optimization agent 346 can gather and analyzes optimization data locally on the system to continually improve IHS performance and usage.

A scheduler agent 347 can manage scheduled device maintenance, and manage scheduled services, e.g., back-up services, etc. A diagnostics agent 348 can provide testing and diagnostics including logs, statistics and alarms (alerts) for use by service support centers and users. A firmware update agent 349 can manage firmware upgrades. A resource management agent 350 can manage system resources and digital contention amongst the various resources, e.g., CPU/Bandwidth utilization, etc. A display agent 351 can perform configuration and preferences management of display devices. A networking agent 352 can provide management of networking interfaces, and might include a Virtual Private Network (VPN) client, a Network Time Protocol (NTP) service, a Domain Name Server (DNS) client and/or server, an HTTP(S) server, a Secure File Transfer Protocol (SFTP) client and/or server, Common Internet Files Services (CIFS) functionality, an EvDO/PPP driver, and/or PPPOE (Point-to-Point Protocol over Ethernet) client, as some examples of various embodiments.

The system agents or services of the system agents/services layer 340 can configure hardware resources via a respective plug-in of the plugins layer 360. Configuration of hardware resources may be implemented in various ways by plug-ins 360. Plug-ins 360 may further access, or may include, hardware drivers, such as operating system drivers for individual ones of hardware resources. Plug-ins 360 may represent modular code that is installed in a particular agent (341-352) for accessing particular hardware resources. Accordingly, each plug-in 360 may be specific to a particular hardware resource as well as being specific to a specific agent or service (341-352). Each one of plug-ins 360 may include monitoring and configuration functionality that may be implemented separately or may be combined. As hardware resources are added, removed, updated, replaced, etc., a corresponding plug-in 360 may be added, removed, updated, replaced, etc.

For example, a power management plugin 361 may provide IHS power management functionality to the agent or service. A battery plugin 362 may provide battery management capability to the agent or service. A video plug-in 363 may provide monitoring and configuration support for graphics, which may represent a graphics interface or a graphics processing unit, and/or may provide monitoring and configuration support for display, which may represent one or more display devices, for example, coupled to graphics. An audio plug-in may provide monitoring and configuration support for audio devices and speakers. An alerts plug-in 365 may allow an agent or service to provide alerts to users. An application optimization plugin 366 may provide boosting of application performance and prioritizing of a task at hand. A suggestions plugin 367 may provide suggestions or recommendations to users including word or sentence completion, for example. An update plugin 368 can provides updates for system software, and can simplify the BIOS, firmware, driver, and application update experience for client hardware. An activity feed plugin 369 can provide a real-time list of actions performed by users on an app or website. An activity feed can display information from a user's online community such as likes, follows, comments, posts, and content share.

A customer connect plugin 370 can provide remote access functionality that allows IT Technicians to remote into the IHS to help troubleshoot any issues a user may be having. A preferences plugin 371 can allow a user to read and write application preferences, and/or change application settings by using a set of custom preferences, in some embodiments. A notifications plugin 372 can facilitate the sending of notifications to the user or an IT service provider. A network communication plugin 373 can provide monitoring and configuration support for a network, which may represent any one or more network interfaces. Such a network communication plugin 373 can enable Ethernet or wireless networking, for example. A USB plugin 374 can provide monitoring and configuration support for communicating with USB devices. An LED plugin 376 can provide control functionality for one or more LED devices for indicating status and other usable information to users of the IHS. A fan control plugin 377 may provide monitoring and configuration support for cooling, which may represent a thermal control system. It is noted that plug-ins 260 and hardware resources 290 described are exemplary and may include other elements in various embodiments.

Figure 4:
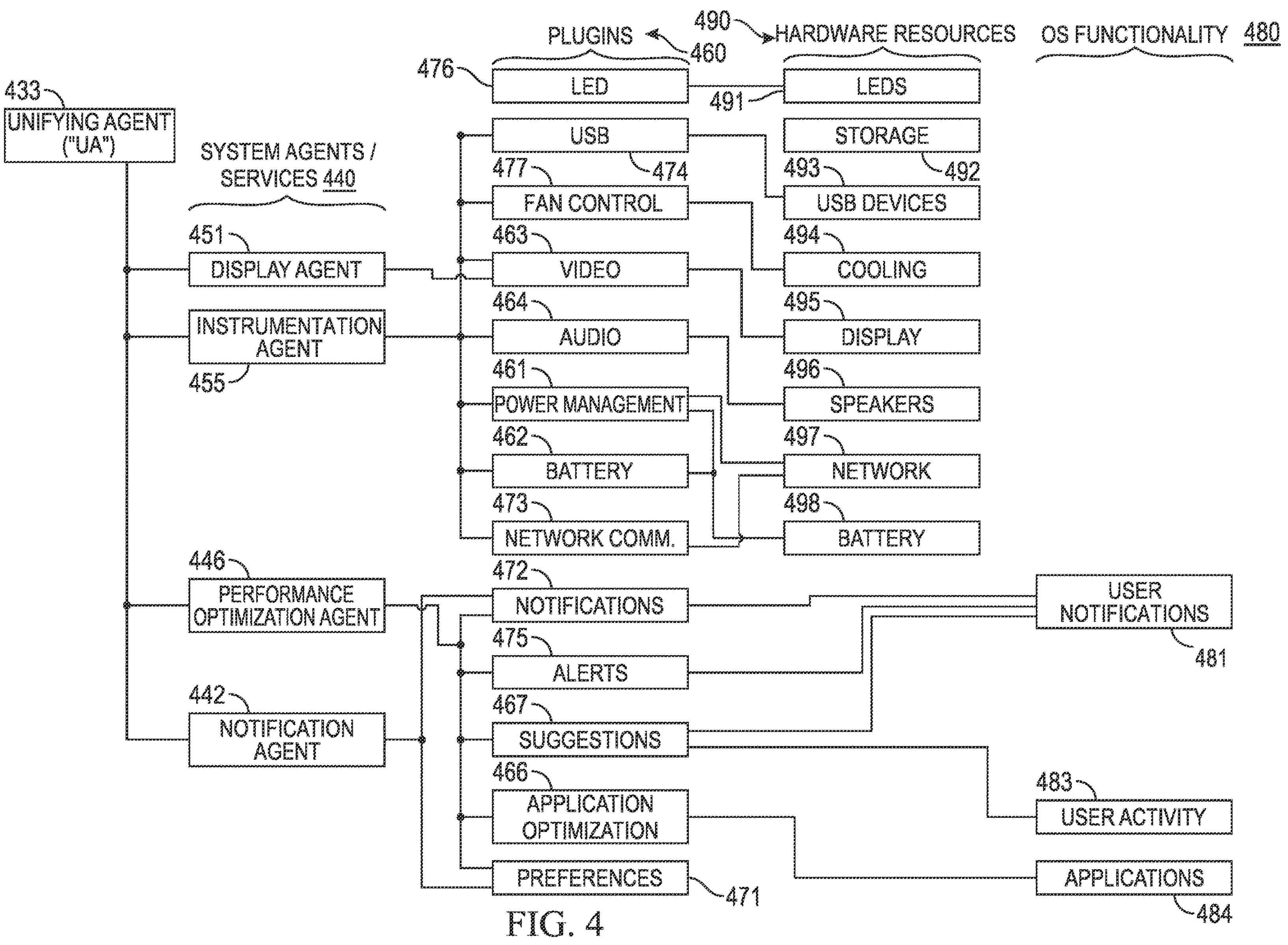
FIG. 4 is a block diagram depicting further details of the software and hardware architectures of an embodiment for prioritizing loading of agents and plugins during boot time of an IHS, including relationships between the ecosystem manager system agents and/or services, plugins, hardware resources, and operating system ("OS") functionality, according to some embodiments.

FIG. 4 is a block diagram depicting further details of the software and hardware architectures of an embodiment for prioritizing loading of agents and plugins during boot time of an IHS, including relationships between the unifying agent 433, system agents and/or services 440 (e.g., 451, 455, 446, 442), plugins 460, hardware resources 490, and operating system ("OS") functionality 480, according to some embodiments.

Most system critical software, such as antivirus software, device management and other driver associated services, are deployed as system agents/services 440 (e.g., Windows® Services/Agents). An operating system, such as Windows, can support different startup types for agents-"Automatic", "Delayed Start" and "Manual". Automatic agents are loaded at system startup, and therefore allow for better runtime experiences and available capabilities versus Delayed Start agents. Delayed Start agents allow for faster boot times, because those Delayed Start agents are not loaded at boot time. Instead, these agents are prevented from being loaded for a certain amount of time after boot, which can usually be a couple minutes after boot. Manual agents are loaded on-demand, whenever they are needed. This allows the agents to not be loaded if they are not being used, but requires more startup time for any applications or programs that wish to use these agents, at the time that they need to be used.

Similar to agents, plugins 460 can also be loaded in multiple phases. At least some of the phases can be "stage 0"—for plugins to load during boot, "stage 1"—for plugins to load after the delayed start interval, and "stage 2"—for plugins to load on-demand. Once the "stage" for a plugin is configured, then, in some embodiments, an agent associated with the plug-in, or the operating system itself in some embodiments, can load that plugin in accordance with its assigned stage. In some embodiments, most plugins in the system are initially configured as either stage 1 or stage 2.

Initially, antivirus and encryption software, chipset and OEM agents etc., were configured as Automatic start to ensure their services were available at system startup. However, this approach adversely impacted boot times. Some operating system manufacturers, such as Microsoft®, have attempted to address a subset of this problem by requiring original equipment manufacturer ("OEM") software agents to be configured as Delayed Start (e.g., via Windows® Error Reporting ("WER") requirements). However, this approach prevents OEM features, such as touchpads, peripheral keyboard shortcuts, IHS lighting etc., from being available for several minutes after boot. Preventing these features from being available for several minutes after boot leads to a bad user experience, and customer complaints to the OEM.

To provide solutions to this and other problems, a unifying agent ("UA") can be employed. This unifying agent can be an agent ecosystem manager. The unifying agent can be configured to start as "Automatic", meaning that it is loaded at system startup. The unifying agent can be lightweight in its processing requirements, since its scope can be ecosystem infrastructure (e.g., agent lifecycle management, inter-agent communication framework, etc.), in some embodiments. In some embodiments, the unifying agent does not contain any system/business logic.

Referring back to FIG. 4, the unifying agent 433 can be an agent ecosystem manager for the display agent 451, the instrumentation agent 455, the performance optimization agent 446, and the notification agent 442.

Under normal operation, at least some of the agents 440 will be registered with either the ecosystem manager or the UA 433. At least some of these registered agents will initially be delay started. The ecosystem manager or the UA 432 can learn about the capabilities of the agents. For example, referring to the example configuration of FIG. 4, the UA 433 can learn about the capabilities of the display agent 451, the instrumentation agent 455, the performance optimization agent 446, and the notification agent 442. In some embodiments, the UA 433 can remember the application or product interfaces published to the UA or ecosystem manager by the various agents or services. An agent or service 440 can publish an application or product interface to the UA 433 or ecosystem manager when it is associated with the application or product that uses that interface, so that the UA 433 can remember the application or product interfaces associated with the agent or service 440.

The ecosystem manager or the UA 433 can obtain behavior information of one or more users of the IHS regarding at least one application of the IHS. One example of behavior information is a user launching a product user interface. Therefore, for example, when a user launches a product user interfaces (e.g., an OEM graphics user interface ("GUI")) prior to the "delayed start" time, the UA 433 can "trigger start" the corresponding agent with a matching interface plugin context in response to the user action.

Another example of behavior information is a user adding an application to a StartUp folder of an operating system (e.g., a Windows® StartUp folder). When a user adds an application that has dependency on a "delayed start" agent or service into the StartUp folder, the UA 433 can "trigger start" the corresponding agent 440 with a matching interface plugin context in response to the user action.

Another example of behavior information is a user configuring a feature (which maps to some published agent interface) that should be available immediately after the system boots. When a user configures a feature that should be available at system startup, the UA 433 can "trigger start" the corresponding agent 440 with a matching interface plugin context in response to the user action.

Another example of behavior information is a user plugging in a peripheral to the IHS. When a user plugs in a peripheral, the UA 433 can determine the device ID and can "trigger start" the corresponding agent with matching interface plugin context, in some embodiments. In some embodiments, the plugin associated with the peripheral can determine the device ID and can "trigger start" the corresponding agent with matching interface plugin context. In some embodiments, the UA 433 can load the necessary plugin if the agent is already running but without the needed plugin. In some embodiments, the agent itself can load the necessary plugin if the agent is already running but without the needed plugin.

In some embodiments, the UA 433 can learn system capabilities and user configured actions. In some embodiments, some of the various agents 440 can, in addition to the UA, or instead of the UA, learn system capabilities and user configured actions. Either the ecosystem manger, the UA 433, or some of the various agents 440 can scan system hardware and capabilities for identifying which plugins 460 to load. As stated previously, plugins can be loaded in multiple phases-stage 0 (for plugins to load during boot), stage 1 (plugins to load after delay start interval) and stage 2 (on-demand load).

Referring back to FIG. 4, the display agent 451 is associated with the video plugin 463. The instrumentation agent 455 is associated with the USB 474, fan control 477, video 436, audio 464, power management 461, battery 462, and network communication 473 plugins. The performance optimization agent 446 is associated with the notifications 472, alerts 475, suggestions 467, application optimization 466, and preferences 471 plugins. The notification agent 442 is associated with the notifications plugin 472 and the preferences plugin 471.

Plug-ins 460 may represent modular code that is installed in a particular agent for accessing particular hardware resources 490 or OS functionality 480. Accordingly, each plug-in 460 may be specific to a particular hardware resource 490 (or OS functionality 480) as well as being specific to a specific agent or service 440. Each one of plug-ins 460 may include monitoring and configuration functionality that may be implemented separately or may be combined. As hardware resources 490 (or OS functionality 480) are added, removed, updated, replaced, etc., a corresponding plug-in 460 may be added, removed, updated, replaced, etc.

For example, an LED plug-in 476 may provide monitoring and configuration support for IHS LEDs 491. A USB plug-in 474 may provide monitoring and configuration support for USB devices 493. A fan control plug-in 477 may provide monitoring and configuration support for cooling hardware resources 494. A video plug-in 463 may provide monitoring and configuration support for a display 495, which may represent one or more display devices, for example, coupled to graphics. An audio plug-in 464 may provide monitoring and configuration support for speakers 496. A power management plug-in 461 may provide monitoring and configuration support for a network 497 and a battery 498. A battery plug-in 462 may provide monitoring and configuration support for the battery 498. A network communication plug-in may provide monitoring and configuration support for the network 497, which may represent any one or more network interfaces. The notifications 472, alerts 475, and suggestions 467 plug-in may provide monitoring and configuration support for user notifications 481 functionality of the operating system. The suggestions plug-in 467 may also provide monitoring and configuration support for the user activity 483 functionality of the operating system. The application optimization plug-in may provide monitoring and configuration support for the application management 484 portion of the operating system.

In some embodiments, the UA 433 can determine that an agent and/or plugin should be available immediately after the system boots based, at least in part, on the behavior information of one or more users. In some embodiments, the UA 433 can provide a boot loading priority setting for at least one agent or plugin, where the boot loading priority is determined based, at least in part, upon post-boot behavior of a user of the IHS. In some embodiments, a corresponding agent can learn that a plugin should be available at system startup based, at least in part, on user behavior. The UA 433 or corresponding agent can then update the corresponding plugin's boot loading priority, (e.g., load metadata) to "stage 0", in some embodiments. Plugin dependencies can be automatically addressed, in some embodiments, because some plugin manager frameworks (e.g., Dell Client Framework ("DCF")) already account for dependencies at load time. The agent or plugin can be launched then, according to the boot loading priority, in a subsequent boot.

An agent or the UA 433 can also remember each time the agent is "trigger started" in response to a user configuration request, or other user behavior, prior to the "delayed start" time. Over time, the agent or the UA can learn from this user behavior, and then update a corresponding plugin's boot loading priority to stage 0 plugin, so the user does not experience any GUI or user experience delays from waiting for the plugin to load after a GUI is launched.

Figure 5:
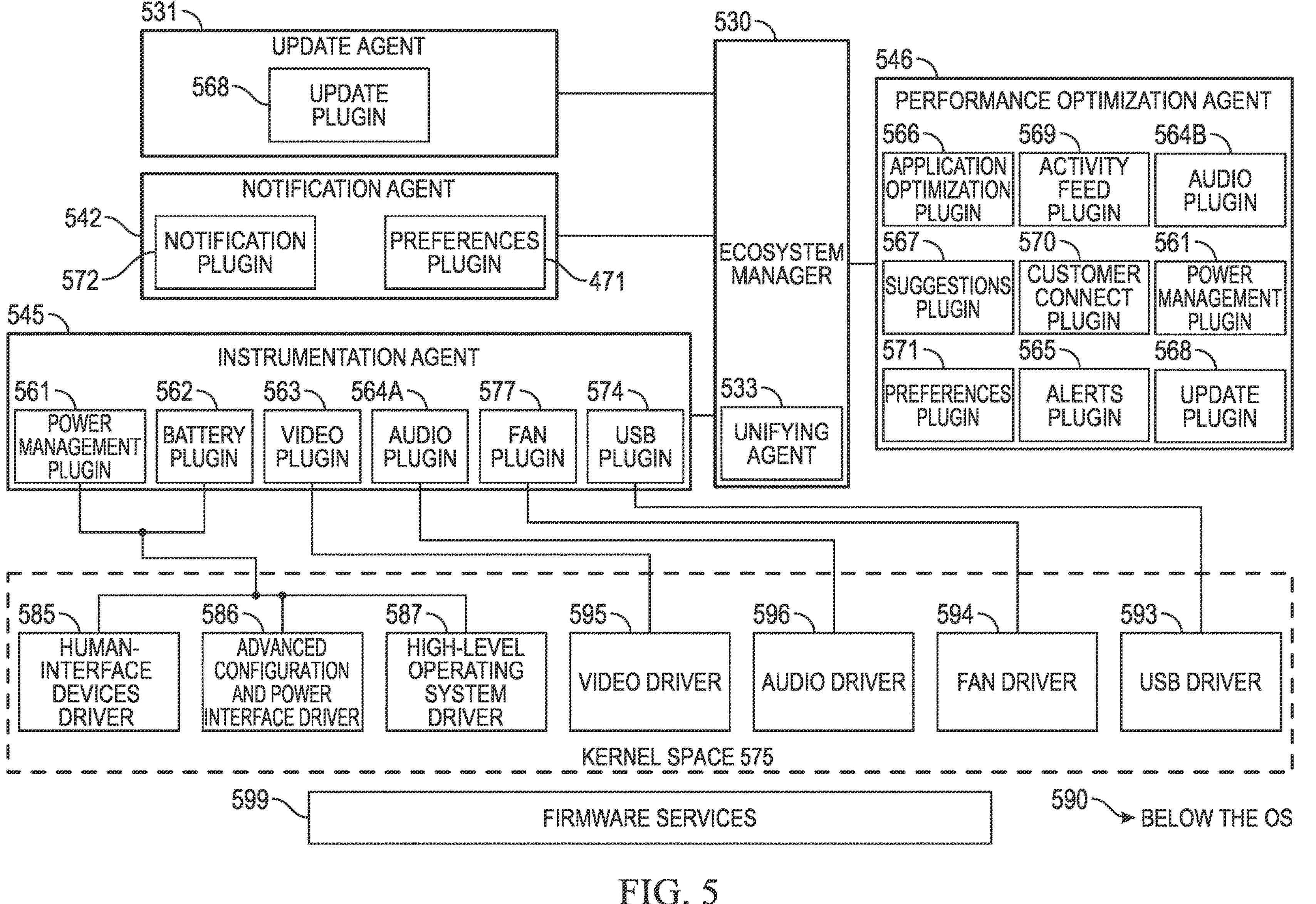
FIG. 5 is a block diagram depicting further details of the software and hardware architectures of an embodiment for prioritizing loading of agents and plugins during boot time of an IHS, including relationships between the unifying agent and other agents, plugins, drivers, and firmware services, according to some embodiments.

FIG. 5 is a block diagram depicting further details of the software and hardware architectures of an embodiment for prioritizing loading of agents and plugins during boot time of an IHS, including relationships between the unifying agent 533 and other agents, plugins, drivers, and firmware services, according to some embodiments.

As shown in FIG. 5, the ecosystem manager 530 includes the unifying agent 533 as a component. The unifying agent 533 can act as an agent ecosystem manager, in some embodiments. The unifying agent 433 can be in communication with the update agent 531, the notification agent 542, the instrumentation agent 561, and the performance optimization agent 546. The unifying agent 533 can act as an agent ecosystem manager for these other agents.

The system agents or services can configure hardware resources via a respective plug-ins. Configuration of hardware resources may be implemented in various ways by various plug-ins. Plug-ins may access, or may include, hardware drivers, such as operating system drivers (585, 586, 587, 595, 596, 594, 593) for individual ones of hardware resources. Plug-ins may represent modular code that is installed in a particular agent for accessing particular hardware resources. Accordingly, each plug-in may be specific to a particular hardware resource as well as being specific to a specific agent or service. Each one of plug-ins may include monitoring and configuration functionality that may be implemented separately or may be combined.

Referring to FIG. 5, the update agent 531 is associated with an update plug-in 568. The notification agent 542 is associated with a notification plugin 542 and a preferences plugin 471. The instrumentation agent 561 is associated with a power management plugin 561, a battery plugin 562, a video plugin 563, an audio plugin 564A, a fan plugin 577, and a USB plugin 574. The performance optimization agent 546 is associated with an application optimization plugin 566, an activity feed plugin 569, an audio plugin 564B, a suggestions plugin 567, a customer connect plugin 570, a power management plugin 561, a preferences plugin 571, an alerts plugin 565, and an update plugin 568.

FIG. 5 further shows that some plug-ins may access hardware drivers, such as operating system drivers (585, 586, 587, 595, 596, 594, 593) in the kernel space 575. For example, the power management plugin 561 and the battery plugin 562 can access the human-interface devices ("HID") driver 585. The power management plugin 561 and the battery plugin 562 can also access the advanced configuration and power interface ("ACPI") driver 586. The power management plugin 561 and the battery plugin 562 can also access the high-level operating system ("HLOS") driver 587 (or the HLOS tree driver). The video plugin 563 can access the video driver 595. The audio plugin 564A can access the audio driver 596. The fan plugin 577 can access the fan driver 594. The USB plugin 574 can access the USB driver 593. In turn some of the drivers can access firmware services 599 that are located below 590 the operating system.

The unifying agent 533 can be an agent ecosystem manager. Under normal operation, at least some of the agents (531, 542, 545, 546) will be registered with either the ecosystem manager 530 or the UA 533. At least some of these registered agents will initially be delay started. The ecosystem manager 530 or the UA 533 can learn about the capabilities of the agents. In some embodiments, the UA 533 can remember the application or product interfaces published to the UA or ecosystem manager by the various agents or services. An agent or service (531, 542, 545, 546) can publish an application or product interface to the UA 533 or ecosystem manager 530 when it is associated with the application or product that uses that interface, so that the UA 533 can remember the application or product interfaces associated with the agent or service.

The ecosystem manager 530 or the UA 533 can obtain behavior information of one or more users of the IHS regarding at least one application of the IHS. One example of behavior information is a user launching a product user interface. Therefore, for example, when a user launches a product user interfaces (e.g., an OEM graphics user interface ("GUI")) prior to the "delayed start" time, the UA 533 can "trigger start" the corresponding agent with a matching interface plugin context in response to the user action.

Another example of behavior information is a user adding an application to a StartUp folder of an operating system (e.g., a Windows® StartUp folder). When a user adds an application that has dependency on a "delayed start" agent or service into the StartUp folder, the UA 533 can "trigger start" the corresponding agent with a matching interface plugin context in response to the user action.

Another example of behavior information is a user configuring a feature (which maps to some published agent interface) that should be available immediately after the system boots. When a user configures a feature that should be available at system startup, the UA 533 can "trigger start" the corresponding agent with a matching interface plugin context in response to the user action.

Another example of behavior information is a user plugging in a peripheral to the IHS. When a user plugs in a peripheral, the UA 533 can determine the device ID and can "trigger start" the corresponding agent with matching interface plugin context, in some embodiments. In some embodiments, the plugin associated with the peripheral can determine the device ID and can "trigger start" the corresponding agent with matching interface plugin context. In some embodiments, the UA 533 can load the necessary plugin if the agent is already running but without the needed plugin. In some embodiments, the agent itself can load the necessary plugin if the agent is already running but without the needed plugin.

In some embodiments, the UA 533 can learn system capabilities and user configured actions. In some embodiments, some of the various agents (531, 542, 545, 546) can, in addition to the UA, or instead of the UA, learn system capabilities and user configured actions. Either the ecosystem manger 530, the UA 533, or some of the various agents (531, 542, 545, 546) can scan system hardware and capabilities for identifying which plugins to load.

In some embodiments, the UA 533 can determine that an agent and/or plugin should be available immediately after the system boots based, at least in part, on the behavior information of one or more users. In some embodiments, the UA 533 can provide a boot loading priority setting for at least one agent or plugin, where the boot loading priority is determined based, at least in part, upon post-boot behavior of a user of the IHS. In some embodiments, a corresponding agent can learn that a plugin should be available at system startup based, at least in part, on user behavior. The UA 533 or corresponding agent can then update the corresponding plugin's boot loading priority, (e.g., load metadata) to "stage 0", in some embodiments. Plugin dependencies can be automatically addressed, in some embodiments, because some plugin manager frameworks (e.g., DCF) already account for dependencies at load time. The agent or plugin can be launched then, according to the boot loading priority, in a subsequent boot.

An agent or the UA 533 can also remember each time the agent is "trigger started" in response to a user configuration request, or other user behavior, prior to the "delayed start" time. Over time, the agent or the UA can learn from this user behavior, and then update a corresponding plugin's boot loading priority to a stage 0 plugin, so the user does not experience any GUI or user experience delays from waiting for the plugin to load after a GUI is launched.

Figure 6:
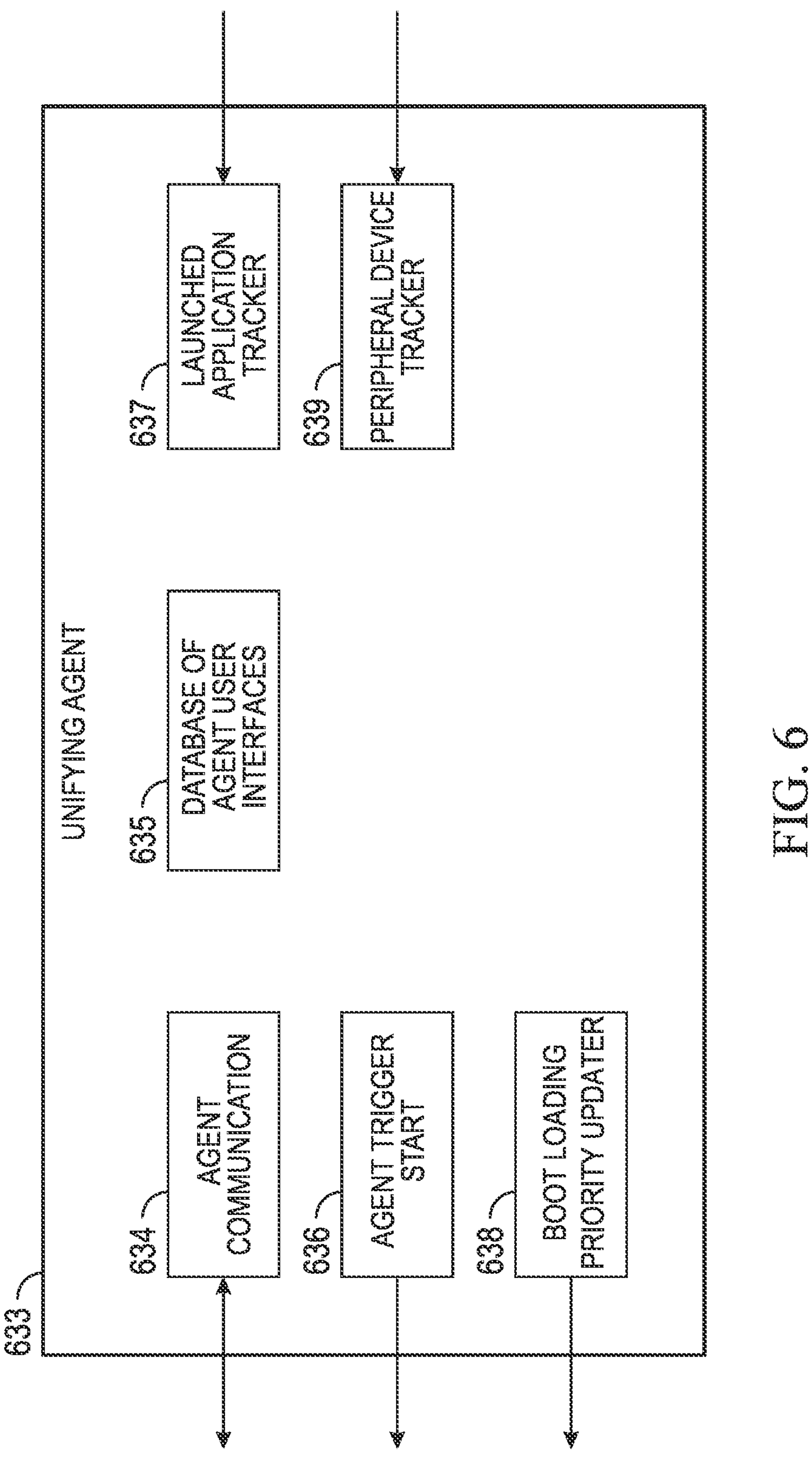
FIG. 6 is a block diagram depicting details of the unifying agent of the ecosystem manager, according to some embodiments.

FIG. 6 is a block diagram depicting details of the unifying agent 633 of the ecosystem manager, according to some embodiments. The UA 633 can include various functional components, depending on the embodiment. Some of the functional components that an example UA might include are shown in FIG. 6. The UA might include a database of agent user interfaces 635. Such a database can allow the UA to associate specific user interfaces to specific agents, so that when a user interface is launched, the UA knows what agents also need to be activated to accommodate that user interface. The UA might include a component for agent communication 634 so that the UA can learn about the capabilities of the agents, and the UA can obtain the application or product interfaces published to the UA by the various agents or services. The UA might include a component to trigger start the agents 636. The UA can include a launched application tracker 637, so that it can keep track of the launched applications or user interfaces, so it knows what agents or plugins need to be activated. The UA can also include a peripheral device tracker 639 to keep track of peripheral devices that are plugged and unplugged from the IHS.

The UA 633 can also include a boot loading priority updater 638. In some embodiments, the UA 633 can determine that an agent and/or plugin should be available immediately after the system boots based, at least in part, on the behavior information of one or more users. In some embodiments, the UA 633 can provide a boot loading priority setting for at least one agent or plugin, where the boot loading priority is determined based, at least in part, upon post-boot behavior of a user of the IHS. The UA 633 can then update the corresponding plugin's boot loading priority, (e.g., load metadata) to "stage 0", in some embodiments, using the boot loading priority updater 638. The agent or plugin can be launched then, according to the boot loading priority, in a subsequent boot. The UA 633 can also remember each time an agent is "trigger started" in response to a user configuration request, or other user behavior, prior to the "delayed start" time. Over time, the UA can learn from this user behavior, and then update a corresponding plugin's boot loading priority to a stage 0 plugin using the boot loading priority updater 638. Thus, the user would not experience any GUI or user experience delays from waiting for the plugin to load after the GUI is launched.

Therefore, various embodiments of the present disclosure can learn from user behavior (i.e., intent to launch a user interface ("UI") at various times) to balance an agent's boot time impact along with the user's experience. Some embodiments can learn from user behavior (e.g., configuration actions) to prioritize loading specific agent functionality during boot. Some embodiments can eliminate delay between a user-triggered user interface application launch, and plugin availability. With no learning, the user would experience the delay of starting the dependent processes and plugins. The learning aspect of some embodiments of the present disclosure should lead to those agents or services and plugins being ready by the time the user interacts with the UI application.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination of thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:

a processor; and a memory coupled to the processor, wherein the memory comprises program instructions stored thereon that, upon execution by the processor, cause the IHS to:

obtain behavior information of one or more users of the IHS regarding at least one application of the IHS; and launch an agent associated with the application during a subsequent boot of the IHS, or load a plugin associated with the application during the subsequent boot of the IHS, based, at least in part, on the behavior information.

2. The IHS of claim 1, wherein the behavior information comprises information regarding a launching of a user interface associated with the at least one application by a user of the one or more users.

3. The IHS of claim 1, wherein the behavior information comprises information regarding an adding of the at least one application to a StartUp folder by a user of the one or more users.

4. The IHS of claim 1, wherein the behavior information comprises information regarding a plugging in of a peripheral associated with the application into the IHS by a user of the one or more users.

5. The IHS of claim 1, wherein to launch the agent associated with the application or load the plugin associated with the application, the program instructions, upon execution by the processor, further cause the IHS to:

trigger start the agent associated with the application during the boot of the IHS based, at least in part, on the behavior information, wherein the agent was scheduled to either start with a delay or start on-demand.

6. The IHS of claim 1, wherein to launch the agent associated with the application or load the plugin associated with the application, the program instructions, upon execution by the processor, further cause the IHS to:

change a configuration of the plugin to load during boot based, at least in part, on the behavior information, wherein the plugin was configured to load either after a delay interval or on-demand.

7. The IHS of claim 6, wherein the behavior information comprises information regarding a plurality of trigger starts of an agent associated with the at least one application, and wherein the agent uses the plugin.

8. The IHS of claim 1, wherein prior to launching the agent associated with the application, or loading the plugin associated with the application, the program instructions further cause the IHS to:

execute a machine learning algorithm to determine to launch the agent during the boot of the IHS, or load the plugin during the boot of the IHS, wherein the determination of the machine learning algorithm is based, at least in part, on the behavior information of the one or more users.

9. The IHS of claim 1, wherein a unifying agent of the IHS is configured to: (i) obtain the behavior information; and (ii) launch the agent or load the plugin.

10. The IHS of claim 1, wherein prior to launching the agent associated with the application, the program instructions further cause the IHS to:

determine that the agent is associated with the application based, at least in part, on a database associating user interfaces to agents.

11. A method, comprising:

receiving a boot priority setting for at least one agent or plugin, wherein the boot priority setting is determined based, at least in part, upon post-boot behavior of a user of an Information Handling System (IHS); and launching the agent or loading the plugin according to the boot priority setting in a subsequent boot.

12. The method of claim 11, wherein the boot priority setting is selected from the group comprising: automatic, and delayed start.

13. The method of claim 12, wherein the at least one agent or plugin is associated with a first application, and wherein in response to the post-boot behavior indicating that the user manually launches a second application that uses the first application, the boot priority setting is automatic.

14. The method of claim 11, wherein in response to the post-boot behavior indicating that the user manually launches an application associated with the agent or plugin upon boot, the boot priority setting is automatic.

15. The method of claim 11, wherein prior to receiving the boot priority setting for the at least one agent or plugin, the method further comprises:

executing a machine learning algorithm to determine to launch the at least one agent during the boot of the IHS, or load the at least one plugin during the boot of the IHS, wherein the determination of the machine learning algorithm is based, at least in part, on behavior information of the user.

16. One or more non-transitory computer-readable storage media storing program instructions, that when executed on or across one or more processors of an Information Handling System (IHS), cause the IHS to:

obtain behavior information of one or more users of the IHS regarding at least one application of the IHS; and launch an agent associated with the application during a subsequent boot of the IHS, or load a plugin associated with the application during the subsequent boot of the IHS, based, at least in part, on the behavior information.

17. The one or more non-transitory computer-readable storage media of claim 16, wherein the behavior information comprises at least one of: information regarding a launching of a user interface associated with the at least one application by a user of the one or more users; information regarding an adding of the at least one application to a StartUp folder by a user of the one or more users; or information regarding a plugging in of a peripheral associated with the application into the IHS by a user of the one or more users.

18. The one or more non-transitory computer-readable storage media of claim 16, wherein to launch the agent associated with the application or to load the plugin associated with the application, the program instructions further cause the IHS to:

trigger start the agent associated with the application during the boot of the IHS based, at least in part, on the behavior information, wherein the agent was scheduled to either start with a delay or start on-demand.

19. The one or more non-transitory computer-readable storage media of claim 16, wherein to launch the agent associated with the application or to load the plugin associated with the application, the program instructions further cause the IHS to:

change a configuration of the plugin to load during boot based, at least in part, on the behavior information, wherein the plugin was configured to load either after a delay interval or on-demand.

20. The one or more non-transitory computer-readable storage media of claim 16, wherein prior to launching the agent associated with the application, or loading the plugin associated with the application, the program instructions further cause the IHS to:

execute a machine learning algorithm to determine to launch the agent during the boot of the IHS, or load the plugin during the boot of the IHS, wherein the determination of the machine learning algorithm is based, at least in part, on the behavior information of the one or more users.

* * * * *